United States Patent
Rajamanickam et al.

(10) Patent No.: US 10,931,531 B2
(45) Date of Patent: Feb. 23, 2021

(54) BANDWIDTH-BASED VIRTUAL ROUTER REDUNDANCY PROTOCOL NODE DESIGNATION

(71) Applicant: Dell Products L.P., Round Rock, TX (US)

(72) Inventors: Sampath Kumar Rajamanickam, Chennai (IN); Karthi Kaliyamoorthy, Kanchipuram (IN); Balamurugan Shanmugam, Chennai (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/390,836

(22) Filed: Apr. 22, 2019

(65) Prior Publication Data

US 2020/0336381 A1  Oct. 22, 2020

(51) Int. Cl.
 *H04L 12/24* (2006.01)
 *G06F 9/455* (2018.01)
 *H04L 29/06* (2006.01)
 *H04L 12/713* (2013.01)

(52) U.S. Cl.
 CPC ...... *H04L 41/0896* (2013.01); *G06F 9/45558* (2013.01); *H04L 45/586* (2013.01); *H04L 69/22* (2013.01); *G06F 2009/45595* (2013.01)

(58) Field of Classification Search
 CPC . H04L 41/0896; H04L 69/22; H04L 41/0668; H04L 45/586; H04L 45/28; H04L 2012/5627; G06F 9/45558; G06F 2009/45595
 See application file for complete search history.

(56) References Cited

U.S. PATENT DOCUMENTS

| | | | | |
|---|---|---|---|---|
| 10,560,379 | B1* | 2/2020 | Ghosh | H04L 43/0888 |
| 2010/0149980 | A1* | 6/2010 | Cheung | H04Q 3/0087 370/235 |
| 2012/0008635 | A1* | 1/2012 | Kuo | H04L 45/00 370/410 |
| 2015/0117179 | A1* | 4/2015 | Sato | H04L 45/00 370/219 |
| 2019/0014040 | A1* | 1/2019 | Yerrapureddy | H04L 12/28 |

OTHER PUBLICATIONS

Nadas, S. "Virtual Router Redundancy Protocol (VRRP) Version 3 for IPv4 and IPv6", Internet Engineering Task Force (IETF), Standards Track, Mar. 2010, https://tools.ieff.org/html/rfc5798.

\* cited by examiner

*Primary Examiner* — Steven H Nguyen
(74) *Attorney, Agent, or Firm* — Norton Rose Fulbright US LLP

(57) ABSTRACT

A first information handling system may determine a first bandwidth of a first connection between the first information handling system and a client information handling system. The first information handling system may also determine a second bandwidth of a second connection between a second information handling system and the client information handling system. The first information handling system may determine that the first bandwidth is greater than the second bandwidth. Based on the determination, the first information handling system may be designated as a VRRP master node based. Based on the designation as the VRRP master node, the first information handling system may control VRRP operation of the first and second information handling systems.

20 Claims, 5 Drawing Sheets

BANDWIDTH-BASED VIRTUAL ROUTER REDUNDANCY PROTOCOL NODE DESIGNATION

FIELD OF THE DISCLOSURE

The instant disclosure relates to communication between information handling systems. More specifically, portions of this disclosure relate to designation of a virtual router redundancy protocol (VRRP) master node based on connection bandwidth.

BACKGROUND

As the value and use of information increase, individuals and businesses seek additional ways to process and store information. One option available for such a purpose is the information handling system (IHS). An information handling system generally processes, compiles, stores, and/or communicates information or data for business, personal, or other purposes thereby allowing users to take advantage of the value of the information. Because technology and information handling requirements vary between different users or applications, information handling systems may also vary regarding what information is handled, how the information is handled, how much information is processed, stored, or communicated, and how quickly and efficiently the information may be processed, stored, or communicated. Variations in information handling system build and capabilities allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be networked to share information. For example, client information handling systems, such as personal computers, laptops, tablets, servers, switches, routers, and other information handling systems may be connected to other client information handling systems via intermediary information handling systems, such as routers and switches, to facilitate transmission and receipt of information. As the number of interconnected information handling systems increases, the complexity of networks of intermediary information handling systems, to facilitate information sharing, also increases.

Multiple peer routers or switches may be connected to a plurality of networked client information handling systems to facilitate transmission of information from and receipt of information by the client information handling systems. In some cases, peer routers or switches may be connected to provide redundancy, with one designated as a master to facilitate transmission of information, and others designated as backups to assume control if the master fails. Multiple layers of intermediary information handling systems may exist, such that one or more intermediary information handling systems may be client information handling systems of another peer group of information handling systems. In some cases, a connection between a client and a router designated as a master may be slower than a connection between a client and a router designated as a backup. Thus, information may be transmitted at a lower rate than the network of information handling systems is capable of transmitting information.

Shortcomings mentioned here are only representative and are included simply to highlight that a need exists for improved information handling systems. Embodiments described herein address certain shortcomings but not necessarily each and every one described here or known in the art. Furthermore, embodiments described herein may present other benefits than, and be used in other applications than, those of the shortcomings described above.

SUMMARY

A VRRP master node may be designated based on connection bandwidth, instead of a predetermined node priority. For example, a first information handling system may be designated as a VRRP master node based on a determination that a bandwidth of a connection between the first information handling system and a client information handling system is greater than a bandwidth of a connection between a second information handling system and a client information handling system. First and second intermediary information handling systems, such as switches or routers, may each be connected to a client information handling system to receive information from and for the client information handling system. The information handling systems may be configured to operate according to VRRP. One of the intermediary information handling systems may be designated as a VRRP master node, and traffic from and for the client information handling system may be routed through the VRRP master node. The other intermediary information handling system may be designated as the VRRP backup node, and may route traffic from and for the client information handling system if the VRRP master node fails. VRRP master and backup node status may be determined based on a connection bandwidth between each of the first and second intermediary information handling systems and the client information handling system. For example, if a connection bandwidth is higher between the first intermediary information handling system and the client information handling system, the first intermediary information handling system may be designated as the VRRP master node, while the second intermediary information handling system may be designated as a VRRP backup node. If the bandwidth of the connection between the second intermediary information handling system and the client becomes faster than the bandwidth of the connection between the first intermediary information handling system and the client, for example due to an upgrade of the second intermediary information handling system or a failure of a port of the first intermediary information handling system, the second information handling system may be designated as the VRRP master node and the first information handling system may be designated as the VRRP backup node. Thus, information from and for the client information handling system may be transmitted across the connection with the highest bandwidth, enhancing data transmission speed.

A first information handling system may be designated as a VRRP master node based on a determination that a bandwidth of a connection between the first information handling system and a client information handling system is greater than a bandwidth of a connection between a second information handling system and the client information handling system. A method for designating a VRRP master node may begin with determining a first bandwidth of a first connection between a first information handling system and a client information handling system. For example, a first information handling system may measure a bandwidth of a connection between itself and a client information handling system. The first information handling system may be an intermediary information handling system, configured to operate according to VRRP and to transmit information for and from the client information handling system.

A second bandwidth of a second connection between a second information handling system and the client information handling system may be determined. The second information handling system may be an intermediary information handling system and a peer of the first information handling system. The second information handling system may also be configured to operate according to VRRP. For example, the first and second information handling systems may be configured to operate in a VRRP master node and VRRP backup node configuration. The first and second information handling systems may be connected to facilitate communication of VRRP control information between the first and second information handling systems. To assist the first information handling system with determination of the second bandwidth, the second information handling system may measure the bandwidth of the second connection and may transmit VRRP control information to the first information handling system including the measured bandwidth. For example, the second information handling system may encode the second bandwidth of the second connection in a VRRP header and may transmit the VRRP header to the first information handling system. The first information handling system may then determine the bandwidth of the second connection by extracting the second bandwidth from the VRRP header.

The first information handling system may then compare the first bandwidth with the second bandwidth to determine which is greater. For example, a determination may then be made that the first bandwidth is greater than the second bandwidth.

The first information handling system may be designated as a VRRP master node based, at least in part, on the determination that the first bandwidth is greater than the second bandwidth. For example, the first information handling system may designate itself as the VRRP master node and may transmit notifications to the second information handling system and the client information handling system that the first information handling system is designated as the VRRP master node. In some embodiments, the first information handling system may designate itself as the VRRP master node in spite of a priority of the first information handling system being lower than a priority of the second information handling system. For example, in some networks a VRRP master node may be selected based on priority values assigned to intermediary information handling systems. If a first intermediary information handling system is assigned a priority value of 150, while a second intermediary information handling system is assigned a priority value of 100, the first intermediary information handling system may be designated as the VRRP master node because its priority value of 150 is greater than the second intermediary information handling system's priority value of 100. However, as discussed herein, priority values may be ignored and connection bandwidths may be used instead to designate a master VRRP node, allowing data to and from the client information handling system to be transmitted across a connection with the greatest bandwidth. Ignoring priority values and using connection bandwidth instead for designation of a VRRP master node may have a further advantage of selecting a connection with the greatest bandwidth for information transfer even when priority values are incorrectly assigned due to human error, such as assignment of a higher priority value to a connection with a lower bandwidth. Transmitting information for and from a client information handling system may improve a user experience by reducing latency. Thus, the features described herein may reduce a delay between a request for information by a user and receipt of information by the user.

In some embodiments, the first information handling system may change its designation from VRRP backup node to VRRP master node. For example if the bandwidth of the second connection was previously higher than the bandwidth of the first connection and the bandwidth of the second connection dropped below the bandwidth of the first connection, or if the bandwidth of the first connection increased above the bandwidth of the second connection, the first information handling system may change its designation from VRRP backup node to VRRP master node. Bandwidth changes may occur due to connection failures, such as failure of a port of a connection or port flapping, or upgrades to a connection.

After the first information handling system is designated as a VRRP master node, VRRP operation of the first and second information handling systems may be controlled by the first information handling system based, at least in part, on the designation of the first information handling system as the VRRP master node. For example, a virtual media access control (VMAC) address of the first and second information handling systems may be set by the first information handling system. The first information handling system may also establish a VRRP advertisement interval for transmission of VRRP control information by the first and second information handling systems. Traffic from and for the client information handling system may be routed through the first information handling system based on the designation of the first information handling system as the VRRP master node.

The first information handling system may also transmit VRRP control information to the second information handling system including the first bandwidth. For example, the first information handling system may encode the first bandwidth of the first connection in a VRRP header and may transmit the VRRP header to the second information handling system. The second information handling system may compare the first bandwidth with the second bandwidth and may determine that the second bandwidth is less than the first bandwidth. Based on the determination, the second information handling system may designate itself as the VRRP backup node. The second information handling system may transmit notifications to the first information handling system and the client information handling system notifying them that the second information handling system is designated as the VRRP backup node.

An information handling system may include a processor for performing the steps described herein. A computer program product may include a non-transitory computer readable medium comprising instructions to perform the steps described herein.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, a two-in-one laptop/tablet computer, mobile device (e.g., personal digital assistant (PDA), smart phone, tablet computer, or smart watch), server (e.g., blade server or rack server), a network storage device, a router, a switch, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more virtual or physical buses operable to transmit communications between the various hardware and/or software components.

Figure 1:
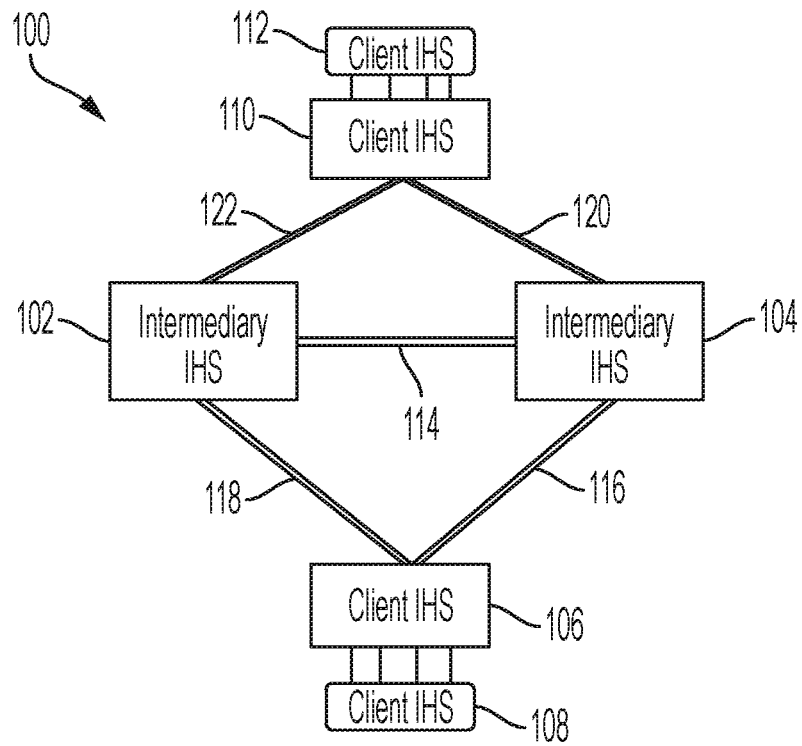
FIG. 1 is a block diagram of an example network according to some embodiments of the disclosure.

Information handling systems may be networked to exchange information. For example, in the example network 100 of FIG. 1, communication between client information handling systems 106, 108, 110, 112 may be facilitated by intermediary information handling systems 102, 104. A first intermediary information handling system 102 may connect a first client information handling system 106 to a second client information handling system 110. A second intermediary information handling system 104 may also connect the first client information handling system 106 to the second client information handling system 110. The first client information handling system 106 may be further connected to a third client information handling system 108, and the second client information handling system 110 may be further connected to a fourth client information handling system 112. The third and fourth client information handling systems 108, 112 may communicate through the first and second client information handling systems 106, 110 and the first and second intermediary information handling systems 102, 104. Thus, the first and second client information handling systems 106, 110 may function as intermediary information handling systems with respect to third and fourth client information handling systems 108, 112.

Intermediary information handling systems 102, 104 may be routers or switches configured to facilitate exchange of information between client information handling systems 106, 110. Client information handling systems 106, 108, 110, 112 may, for example, be desktop computers, laptops, mobile devices, servers, or other information handling systems. In some embodiments, client information handling systems 106, 108, 110, 112 may themselves be intermediary information handling systems such as routers or switches. For example, the first client information handling system 106 may be a top of rack (TOR) switch and may facilitate communication with one or more server blades of the third client information handling system 108. Likewise, the second client information handling system 110 may also be a TOR switch of a different server rack from the fourth client information handling system 106 and may facilitate communication with one or more server blades of client information handling system 112. Thus, the fourth client information handling system 108 may communicate with the third client information handling system 112 via the first client information handling system 106, either or both of intermediary information handling systems 102, 104, and the second client information handling system 110.

The first intermediary information handling system 102 may be connected to the first client information handling system 106 via a first connection 118 and may be connected to the second client information handling system 110 via a second connection 122. The second intermediary information handling system 104 may be connected to the first client information handling system 106 via a third connection 116 and may be connected to the second client information handling system 110 via a fourth connection 120. In some embodiments, first and third connections 116 and 118 may be trunked together according to a virtual link trunking (VLT) protocol. Second and fourth connections 120, 122 may also be trunked together according to a VLT protocol.

The information handling systems may be configured to operate according to a virtual router redundancy protocol (VRRP). For example, the first and second intermediary information handling systems 102, 104 may be connected via a fifth connection 114 to exchange VRRP control information. The first connection 114 may, for example, be an inter-chassis link (ICL). One of the intermediary information handling systems 102, 104 may be designated as the VRRP master node while the other may be designated as the VRRP backup node. Traffic from and for the client information handling systems 106, 108, 110, 112 may be routed through the VRRP master node, while the VRRP backup node may provide redundancy, serving as a backup for the VRRP master node in case of a failure of the VRRP master node.

If the first intermediary information handling system 102 is designated as the primary node communication from the first client information handling system 106 may be routed to the second client information handling system 110 via the first connection 118, the first intermediary information handling system 102, and the third connection 122. The second intermediary information handling system 104 may be designated as a VRRP backup node and may wait in reserve for a failure of the first intermediary information handling system 102. If the second intermediary information handling system 104 is designated as the primary node, communication from the first client information handling system 106 may be routed to the second client information handling system 110 via the second connection 116, the second intermediary information handling system 104, and the fourth connection 120. The first intermediary information handling system 102 may be designated as a VRRP backup node and may wait in reserve for a failure of the second intermediary information handling system 104.

Figure 2:
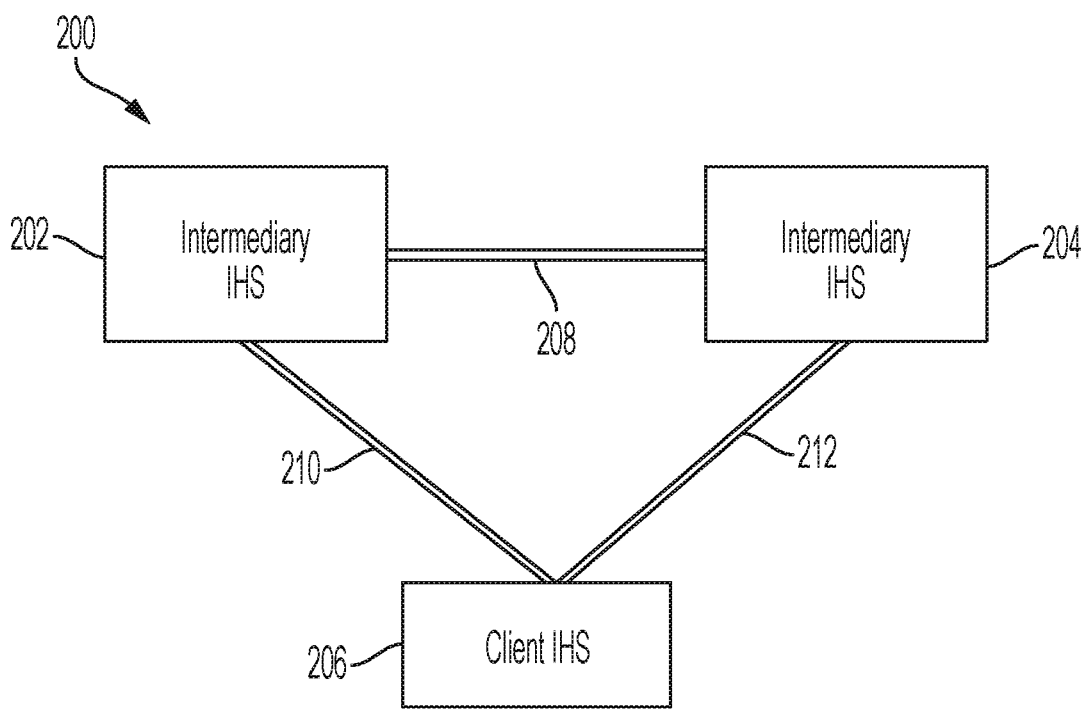
FIG. 2 is a block diagram of example peer information handling systems and a client information handling system according to some embodiments of the disclosure.

FIG. 2 shows a simplified network 200 having a first intermediary information handling system 202, a second intermediary information handling system 204, and a client information handling system 206. The first and second intermediary information handling systems 202, 204 may connect the client information handling system 206 to external information handling systems. The first and second intermediary information handling systems 202, 204 may, for example, be routers or switches and may be peer intermediary information handling systems. Peer information handling systems may be located at the same level of a network topology. The client information handling system 206 may, for example be a desktop, laptop, mobile device, server, or other information handling system. In some embodiments, the client information handling system 206 may also be an intermediary information handling system connecting additional client information handling systems to the first and second intermediary information handling systems 202, 204. For example, the client information handling system 206 may be a TOR switch.

The first intermediary information handling system 202 may communicate with the second intermediary information handling system 204 via a first connection 208, such as an ICL. For example, the first and second intermediary information handling systems 202, 204 may exchange VRRP control information across the first connection 208. VRRP control information may be contained in VRRP headers. The first intermediary information handling system 202 may communicate with the client information handling system 206 via a second connection 210. The second intermediary information handling system 204 may communicate with the client information handling system 206 via a third connection 212. In some embodiments the second and third connections 210, 212 may be trunked together according to a VLT protocol.

The first intermediary information handling system 202, the second intermediary information handling system 204, and the client information handling system 206 may be configured to operate according to a VRRP. For example, one of the intermediary information handling systems 202, 204 may be configured as a VRRP master node, while the other may be configured as a VRRP backup node. Traffic to and from the client information handling system 206 may be routed through the VRRP master node, while the VRRP backup node may provide redundancy, taking over traffic routing if the VRRP master node fails.

The VRRP master node may be designated based on a connection speed of second connection 210 and third connection 212. For example, a bandwidth of the first connection 210 may be compared with a bandwidth of the second connection 212. If the bandwidth of the first connection 210 is greater than the bandwidth of the second connection 212, the first intermediary information handling system 202 may be designated as the VRRP master node, while the second intermediary information handling system 204 may be designated as the VRRP backup node. Thus, traffic from and for the client information handling system 206 may be routed through the second connection 210 and the first intermediary information handling system 202. If the second intermediary information handling system 204 or the third connection 212 is upgraded, such that the bandwidth of the third connection 212 increases to exceed the bandwidth of the second connection 210, the designation of the second intermediary information handling system 204 may be changed to VRRP master node, while the designation of the first intermediary information handling system 202 may be changed to VRRP backup node. Likewise, if the second connection 210 experiences a decrease in bandwidth, such as a decrease due to a failure and/or flap of a port on the first intermediary information handling system 202 or a failure in the second connection 210, dropping below the bandwidth of the third connection 212, the designation of the second intermediary information handling system 204 may be changed to VRRP master node, while the designation of the first intermediary information handling system 202 may be changed to VRRP backup node. For example, second connection 210 may comprise four port channels for transmitting data at 10G each, for a total of 40G. Third connection 212 may be configured to also transmit data at 40G. If a port of the second connection 210 experiences a failure, the bandwidth of the second connection 210 may drop to 30G, below the bandwidth of the third connection 212. In such a scenario, the second intermediary information handling system 204 may be designated as the VRRP master node, so that traffic to and from the client information handling system 206 may flow through third connection 212 and the second intermediary information handling system 204. Likewise, if connection 212 is upgraded to transmit information at a rate of 80G, the second intermediary information handling system 204 may be designated as the VRRP master node, even if it has a lower priority value than the first intermediary information handling system 202. Thus, a VRRP master node may be selected based, at least in part, on bandwidths of connections between a client information handling system 206 and first and second intermediary information handling systems 202, 204, and information from and for the client information handling system 206 may be routed through the fastest connection.

Figure 3:
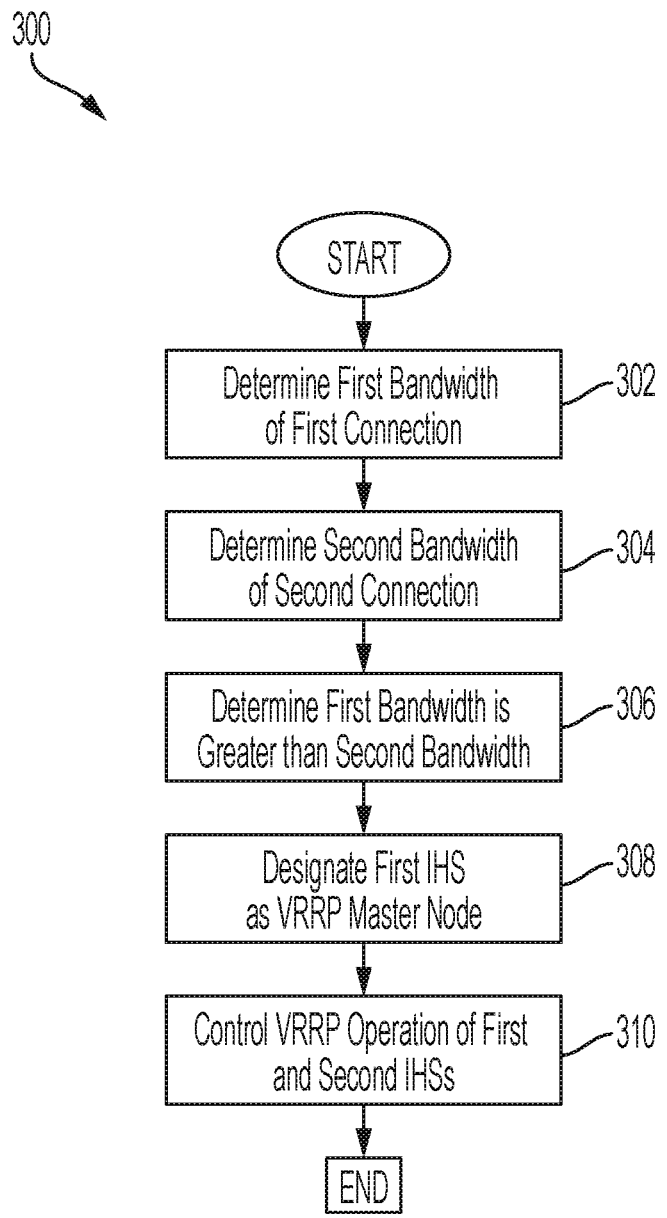
FIG. 3 is a flow chart of an example method for designating a VRRP master node based on connection bandwidth according to some embodiments of the disclosure.

An intermediary information handling system may be designated as a VRRP master node and may assume control of VRRP operation of a network of information handling systems when a bandwidth of a connection between the intermediary information handling system and the client information handling system is greater than a bandwidth of other connections to the client information handling system. An example method 300 of designating a VRRP master node based on bandwidth is shown in FIG. 3. The method 300 may begin at step 302 with determining a first bandwidth of a first connection. For example, first and second information handling systems may be connected to each other and configured to operate according to VRRP. The first and second information handling systems may be peer intermediary information handling systems. The first and second information handling systems may, for example, comprise routers and/or switches. The first information handling system may be connected to a client information handling system by a first connection. The second information handling system may be connected to the client information handling system by a second connection. The client information handling system may, for example, be a server, a desktop, a mobile device, a laptop, or other information handling system. In some embodiments, the client information handling system may itself function as an intermediary information handling system, connecting one or more additional client information handling systems to the first and second information handling systems. For example, the client information handling system may be a TOR switch connecting one or more server blades to the first and second information handling systems.

Thus, as described with respect to step 302, the first information handling system may determine a first bandwidth of the first connection between the first information handling system and the client information handling system. The first information handling system may determine the first bandwidth by measuring a bandwidth of the first connection. Alternatively or additionally, the first information handling system may determine the first bandwidth by accessing a bandwidth for the first connection stored in a memory of the first information handling system or in a remote memory. In some embodiments, the first information handling system may determine active ports of the first connection, may determine a bandwidth for each active port, such as by accessing a bandwidth for each active port stored in memory or by measuring a bandwidth for each active port, and may sum the bandwidths for each active port of the first connection to determine a bandwidth of the first connection.

At step 304, a second bandwidth of the second connection may be determined. For example, the first information handling system may determine a second bandwidth of the second connection between the second information handling system and the client information handling system. Determining the second bandwidth may include receiving VRRP control information from the second information handling system including a bandwidth of the second connection and extracting the bandwidth from the VRRP control information. For example, the bandwidth may be encoded in a VRRP header by the second information handling system, and the VRRP header may be transmitted to the first information handling system via a connection between the first and second information handling systems, such as an ICL. The first information handling system may extract the bandwidth from the VRRP header. The VRRP header may, for example, be a VRRP version 3 header, supporting both internet protocol (IP) version 4 and IP version 6 address families. The second information handling system may determine the second bandwidth by measuring a bandwidth of the second connection. Alternatively or additionally, the second information handling system may determine the bandwidth by accessing a bandwidth for the second connection stored in a memory of the second information handling system or in a remote memory. In some embodiments, the second information handling system may determine active ports of the second connection, may determine a bandwidth for each active port, such as by accessing a bandwidth for each active port stored in memory or by measuring a bandwidth for each active port, and may sum the bandwidths for each active port of the second connection to determine a bandwidth of the second connection. Thus, the first information handling system may determine a bandwidth of the second connection.

At step 306, a determination may be made that the first bandwidth is greater than the second bandwidth. For example, the first information handling system may compare the first bandwidth with the second bandwidth and may determine that the first bandwidth is greater than a second bandwidth. A greater bandwidth the first connection may, for example, indicate a greater speed of the first connection.

At step 308, the first information handling system may be designated as a VRRP master node. For example, based on the determination that the first bandwidth is greater than the second bandwidth, the first information handling system may designate itself as the VRRP master node.

At step 310, the first information handling system may control VRRP operation of the first and second information handling systems based, at least in part, on the designation of the first information handling system as the VRRP master node. The first information handling system may also control VRRP operation of the client information handling system. The first information handling system may transmit notifications, such as VRRP control information, to the second information handling system and the client information handling system informing the second information handling system and the client information handling system that the first information handling system is designated as the VRRP master node. In controlling the VRRP operation, the first information handling system may establish a VMAC address for the first and second information handling systems and may transmit the VMAC address to the second information handling system and/or the client information handling system. The first information handling system may also establish a VRRP advertisement interval at which VRRP control information will be transmitted by the first information handling system and the second information handling system. In some embodiments, VRRP control information may include VRRP headers. When the first information handling system is designated as the VRRP master node, information for and from the client information handling system may be routed through the first information handling system. Peers of the first information handling system, such as the second information handling system may serve as backups to the first information handling system, ready to take over transmission of data to and from the client information handling system should the first information handling system experience a failure. Thus, a first information handling system may be designated as a VRRP master node and may assume control of VRRP operation of networked information handling systems when a bandwidth of a connection between the first information handling system and a client information handling system is greater than a bandwidth of a connection between a second information handling system and the client information handling system.

Figure 4:
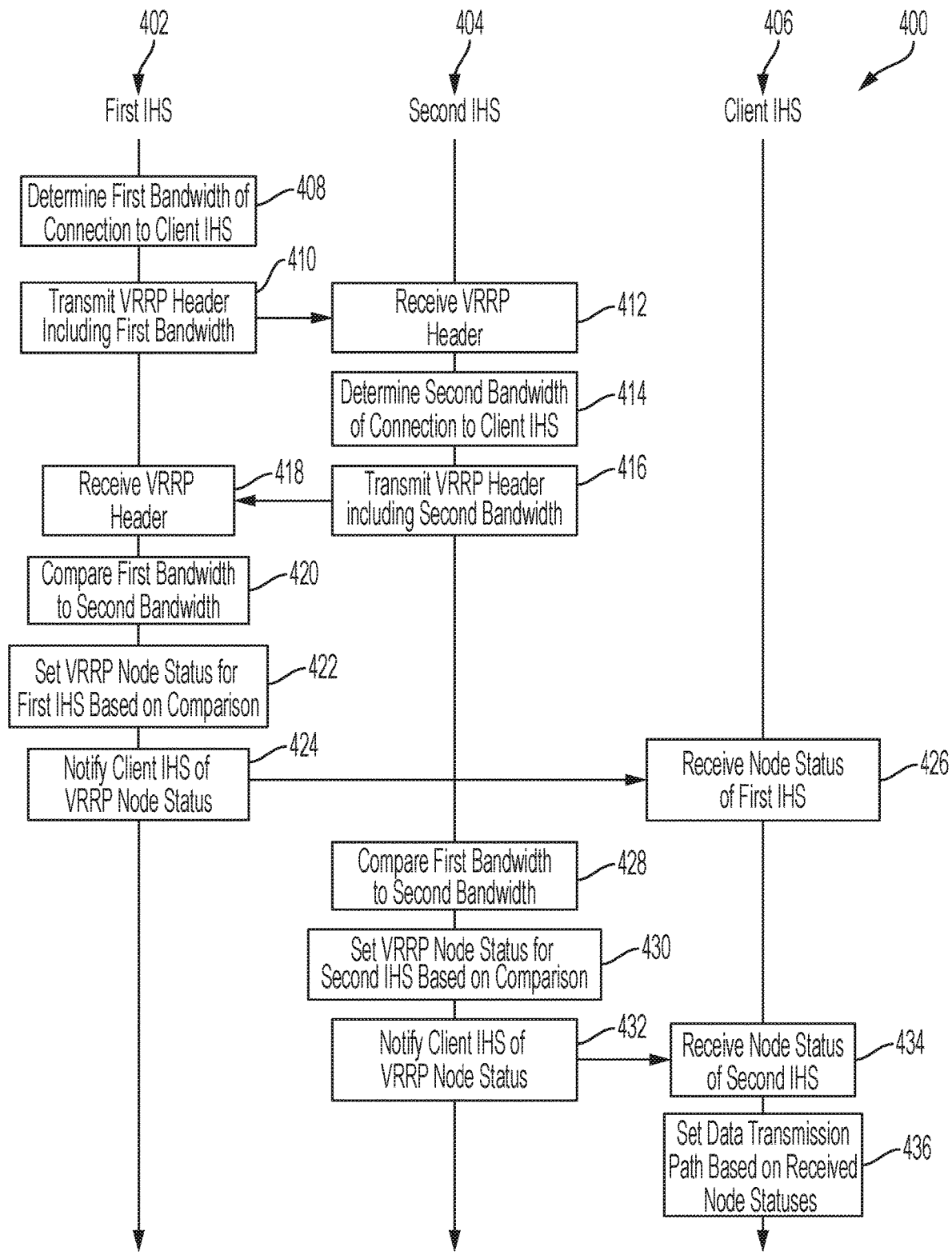
FIG. 4 is process flow diagram of an example method for VRRP node status designation based on connection bandwidth according to some embodiments of the disclosure.

Networked information handling systems may communicate with each other to designate a VRRP master node and VRRP backup node. The process flow diagram 400 of FIG. 4 shows example communication among a first information handling system 402, a second information handling system 404, and a client information handling system 406 for designating master and backup VRRP nodes. The first and second information handling systems 402, 404 may be peer intermediary information handling systems. For example, the first and second information handling systems 402, 404 may be routers and/or switches. The first and second information handling systems 402, 404 may communicate VRRP control information via a connection, such as an ICL. The first and second information handling systems 402, 404 may each be connected to the client information handling system 406 to facilitate transfer of information between the client information handling system 406 and other information handling systems connected to the first and second information handling systems 402, 404. The first information handling system 402, the second information handling system 404, and the client information handling system 404 may be configured to operate according to VRRP with one of the first and second information handling systems 402, 404 designated as the VRRP master node, facilitating transfer of information to and from the client information handling system 406 and the other designated as a VRRP backup node, to take the place of the VRRP master node if the VRRP master node fails. As discussed above with respect to FIG. 3, the client information handling system may be a server, a desktop, a mobile device, a laptop, a switch, such as a TOR switch, a router, or other information handling system.

The first information handling system 402 may begin a VRRP designation process at step 408 by determining a first bandwidth of a first connection between the first information handling system 402 and the client information handling system 404. For example, the first information handling system 402 may determine the first bandwidth by measuring a bandwidth of the first connection, such as by pinging the client information handling system 406. Alternatively or additionally, the first information handling system 402 may determine the first bandwidth by accessing a bandwidth for the first connection stored in a memory of the first information handling system 402 or in a remote memory. In some embodiments, the first information handling system 402 may determine active ports of the first connection, may determine a bandwidth for each active port, such as by accessing a bandwidth for each active port stored in memory or by measuring a bandwidth for each active port, and may sum the bandwidths for each active port of the first connection to determine the bandwidth of the first connection.

At step 410, the first information handling system 402 may transmit a VRRP header including the first bandwidth. For example, the first bandwidth may be encoded in a VRRP header by the first information handling system 402. The first information handling system 402 may then transmit the VRRP header including the encoded bandwidth to the second information handling system 404. The first information handling system 402 may also encode other information in the VRRP header, such as an indicator that the information handling systems are to select a VRRP master node based on bandwidth. The indicator, may, for example, be a bit of the header, that is toggled to 1 to indicate bandwidth-based VRRP master selection and 0 to indicate priority-based VRRP master selection. The first information handling system 402 may transmit the VRRP header with the encoded bandwidth to the second information handling system 404. For example, the first information handling system 402 may transmit the VRRP header across an ICL between the first information handling system 402 and the second information handling system 404.

At step 412, the second information handling system 404 may receive the VRRP header from the first information handling system 402. The second information handling system may extract the first bandwidth from the received VRRP header. For example, the second information handling system may check an indicator bit of the header to determine if the indicator bit is set to indicate bandwidth-based VRRP master selection. If the indicator does indicate bandwidth-based VRRP master selection, the second information handling system may extract the first bandwidth.

A step 414, the second information handling system 404 may determine a second bandwidth of a second connection between the second information handling system 404 and the client information handling system 406. For example, the second information handling system 404 may determine the first bandwidth by measuring a bandwidth of the second connection, such as by pinging the client information handling system 406. Alternatively or additionally, the second information handling system 404 may determine the second bandwidth by accessing a bandwidth for the second connection stored in a memory of the second information handling system 404 or in a remote memory. In some embodiments, the second information handling system 404 may determine active ports of the second connection, may determine a bandwidth for each active port, such as by accessing a bandwidth for each active port stored in memory or by measuring a bandwidth for each active port, and may sum the bandwidths for each active port of the second connection to determine the bandwidth of the second connection.

At step 416, the second information handling system 404 may transmit a VRRP header including the second bandwidth to the first information handling system 402. For example, the second bandwidth may be encoded in a VRRP header by the second information handling system 404. The second information handling system 404 may transmit the VRRP header including the encoded bandwidth to the first information handling system 402. The second information handling system 404 may also encode other information in the VRRP header, such as an indicator that the information handling systems are to select a VRRP master node based on bandwidth. The indicator, may, for example, be a bit of the header, that is toggled to 1 to indicate bandwidth-based VRRP master selection and 0 to indicate priority-based VRRP master selection. The second information handling system 404 may transmit the VRRP header including the second bandwidth across an ICL between the second information handling system 404 and the first information handling system 402.

At step 418, the first information handling system 402 may receive the VRRP header from the second information handling system 404. The first information handling system 402 may extract the second bandwidth from the received VRRP header. For example, the first information handling system 402 may check an indicator bit of the header to determine if the indicator bit is set to indicate bandwidth-based VRRP master selection. If the indicator does indicate bandwidth-based VRRP master selection, the first information handling system 402 may extract the second bandwidth.

At step 420, the first information handling system 402 may compare the first bandwidth to the second bandwidth. For example, the first information handling system 402 may determine whether the first bandwidth is greater than the second bandwidth.

At step 422, the first information handling system 402 may set a VRRP node status for the first information handling system 402 based on the comparison. For example, if the first bandwidth of the first connection between the first information handling system 402 and the client information handling system 406 is greater than the second bandwidth of the second connection between the second information handling system 404 and the client information handling system 406, the first information handlings system 402 may designate itself as the VRRP master node. As the VRRP master node, the first information handling system 402 may assume control of VRRP operation of the first information handling system 402, the second information handling system 404, and the client information handling system 406. For example, the first information handling system 402 may set a VMAC address for the first and second information handling systems 402, 404 and may transmit the VMAC address to the second information handling system 404 and the client information handling system 406. The first information handling system 402 may also set a VRRP advertisement interval for the first and second information handling systems 402, 404 for transmission of VRRP control information to the client information handling system 406. If, at step 422, the first bandwidth is determined to be less than the second bandwidth, the first information handling system may designate itself as the VRRP backup node.

If the first and second bandwidths are equal, the first information handling system may designate itself as the VRRP master node or VRRP backup node based on a priority value of the first information handling system 402. For example, the first information handling system 402 may also receive a priority value of the second information handling system 404 in VRRP control information, such as a VRRP header, received from the second information handling system 404. The priority value assigned to the second information handling system 404 may, for example, be 100. The first information handling system 402 may compare its VRRP priority value, such as a priority value of 150, with the VRRP priority value of the second information handling system 404. If the VRRP priority value of the first information handling system 402 is greater than the VRRP priority value of the second information handling system 404, the first information handling system 402 may designate itself as the VRRP master node. If the VRRP priority value of the first information handling system 402 is less than the VRRP priority value of the second information handling system 404, it may designate itself as the VRRP backup node. Thus, a priority value may be used to designate a VRRP master node when bandwidths of connections are equal.

At step 424, the first information handling system 402 may notify the client information handling system 406 of its status. For example, the first information handling system may transmit VRRP control information to the client information handling system 406 notifying the client information handling system 406 of whether the first information handling system 402 is designated as the VRRP master node or as the VRRP backup node. At step 426 the client information handling system 406 may receive the node status notification from the first information handling system 402.

At step 428, the second information handling system 404 may compare the first bandwidth to the second bandwidth. For example, the second information handling system 404 may determine whether the first bandwidth is greater than the second bandwidth.

At step 430, the second information handling system 404 may set a VRRP node status for the second information handling system 404 based on the comparison. For example, if the second bandwidth is less than the first bandwidth, the second information handling system 404 may designate itself as the VRRP backup node. As the VRRP backup node, the second information handling system 404 may enter an idle state and/or may serve as a backup to take the place of the first information handling system 402, designated as the VRRP master node, if it fails. If the second bandwidth is greater than the first bandwidth, the second information handling system 404 may designate itself as the VRRP master node and may assume control of VRRP operation of the first information handling system 402, the second information handling system 404, and the client information handling system 406. If the first and second bandwidths are equal, the second information handling system 404 may designate itself as the master or backup VRRP node based on a comparison of priority values of the first information handling system 402 and the second information handling system 404.

At step 432, the second information handling system 404 may notify the client information handling system 406 of its status. For example, the second information handling system may transmit VRRP control information to the client information handling system 406 notifying the client information handling system 406 of whether the second information handling system 404 is designated as the VRRP master node or as the VRRP backup node. At step 434 the client information handling system 406 may receive the node status notification from the second information handling system 404.

At step 436, the client information handling system 406 may set a data transmission path based on the received VRRP node statuses of the first information handling system 402 and the second information handling system 404. For example, if the first information handling system 402 is designated as the VRRP master node, traffic to and from the client information handling system 406 may be routed through the first information handling system 402. Likewise, if the second information handling system 404 is designated as the VRRP master node, traffic to and from the client information handling system 406 may be routed through the second information handling system 404. Thus, information handling system VRRP node status for first and second information handling systems may be determined based on a comparison of bandwidths between the first and second information handling systems and a client information handling system.

Figure 5:
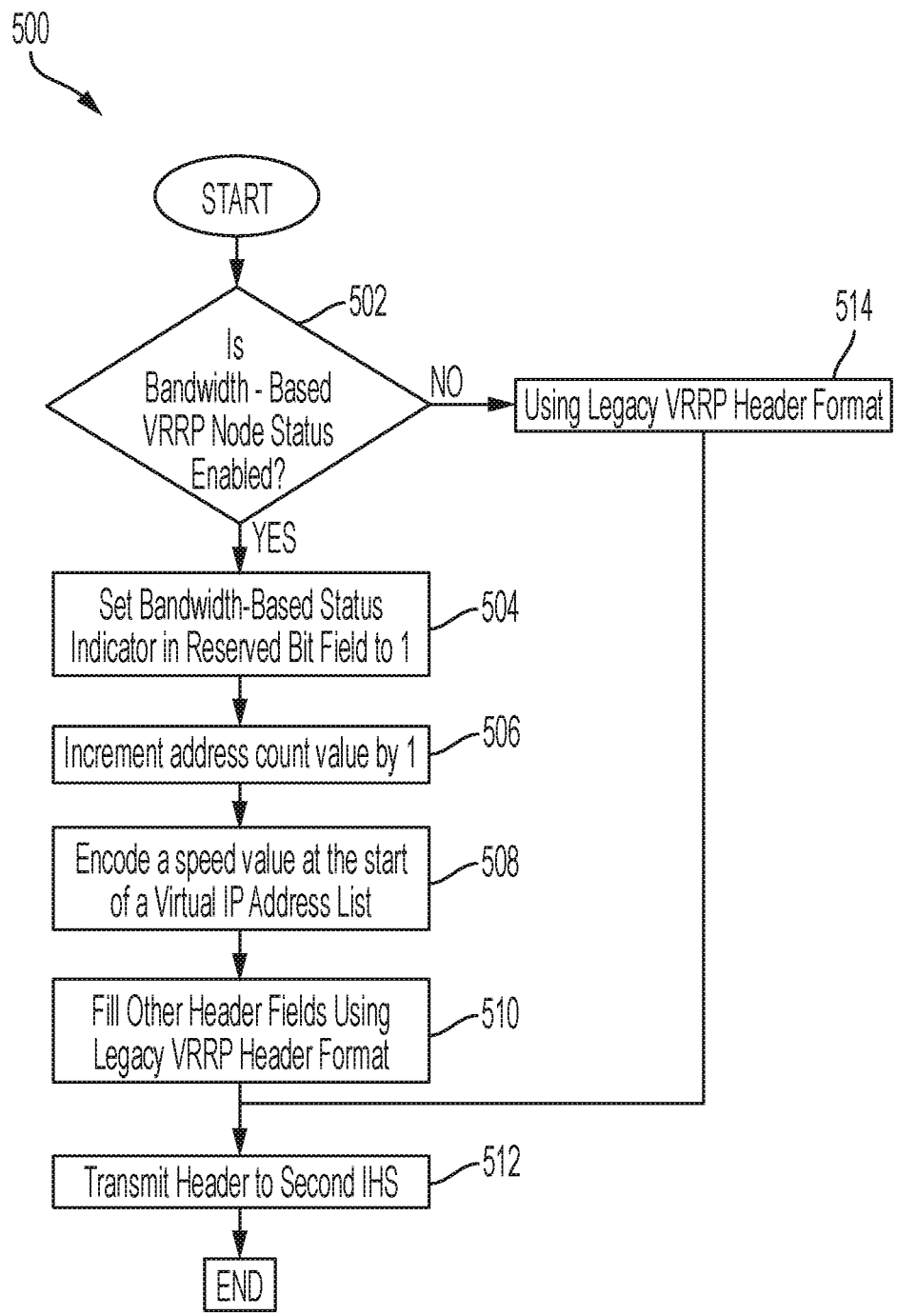
FIG. 5 is a flow chart of an example method for generating a VRRP header according to some embodiments of the disclosure.

A bandwidth of a connection between a first intermediary information handling system and a client information handling system may be encoded into a VRRP header for transmission to a second, peer, intermediary information handling system. An example method 500 for notifying a peer information handling system of a bandwidth of a first connection between a first information handling system and a client information handling system is shown in FIG. 5. The method 500 may begin, at step 502 with a determination of whether bandwidth-based VRRP node status determination is enabled. For example, the first information handling system may access a system configuration to determine if the first information handling system is configured to determine VRRP node status based on a comparison of a first bandwidth between the first information handling system and a client information handling system and a second bandwidth between a second information handling system and the client information handling system. In some embodiments, the first information handling system may communicate with the second information handling system to determine if the peer information handling system is configured for bandwidth-based VRRP node status determination as well. A user may configure the system to enable bandwidth-based VRRP node status designation using a command line interface (CLI). The command line interface may also allow a user to manually configure a VRRP advertisement interval, a VRRP preemption mode, a node priority, a tracking interface, and a virtual IP address of a router.

If bandwidth-based VRRP node status determination is not enabled, a legacy VRRP header format may be used, at step 514. For example, the first information handling system may construct a VRRP header including a priority value, but not including a bandwidth of the first connection. If bandwidth-based VRRP node status determination is not enabled, a bandwidth-based status indicator stored in a reserved bit field of the VRRP header may be set to zero.

If bandwidth-based VRRP node status designation is enabled on the first information handling system, a bandwidth-based status indicator may be set to one, at step 504. For example, the first information handling system may set a bandwidth-based status indicator stored in a reserved bit field of a VRRP header to one. At step 506, an address count value of an address count stored in the VRRP header may be incremented by one. For example, the first information handling system may increment an address count of a VRRP header by one. If the network of information handling systems includes two VRRP virtual IP addresses, the address count value may be set to three, as the bandwidth may also be encoded in the virtual IP address list. Thus the information handling system receiving the header will be informed that three values are included in a virtual internet protocol (IP) address list of the VRRP header. At step 508, a speed value of a connection between the first information handling system and the client information handling system may be encoded. For example, a bandwidth of the connection may be determined, as described herein, and may be encoded in a VRRP header. The bandwidth may, for example, be encoded at a start of a virtual IP address list of the VRRP header. The bandwidth may be encoded in megabits per second. At step 510, the remaining fields of the VRRP header may be filled, using a legacy VRRP header format. For example, a VRRP priority value may be included in the VRRP header and virtual IP addresses of the first and second information handling systems may be included in the virtual IP address list.

Following completion of the VRRP header at either step 514 or step 510, the first information handling system may, at step 512, transmit the VRRP header to the second information handling system. For example, the first information handling system may transmit the header over an ICL between the first information handling system and the second information handling system. Thus, the first information handling system may notify the second information handling system of a bandwidth between the first information handling system and the client information handling system, when bandwidth-based VRRP node status determination is enabled.

Figure 6:
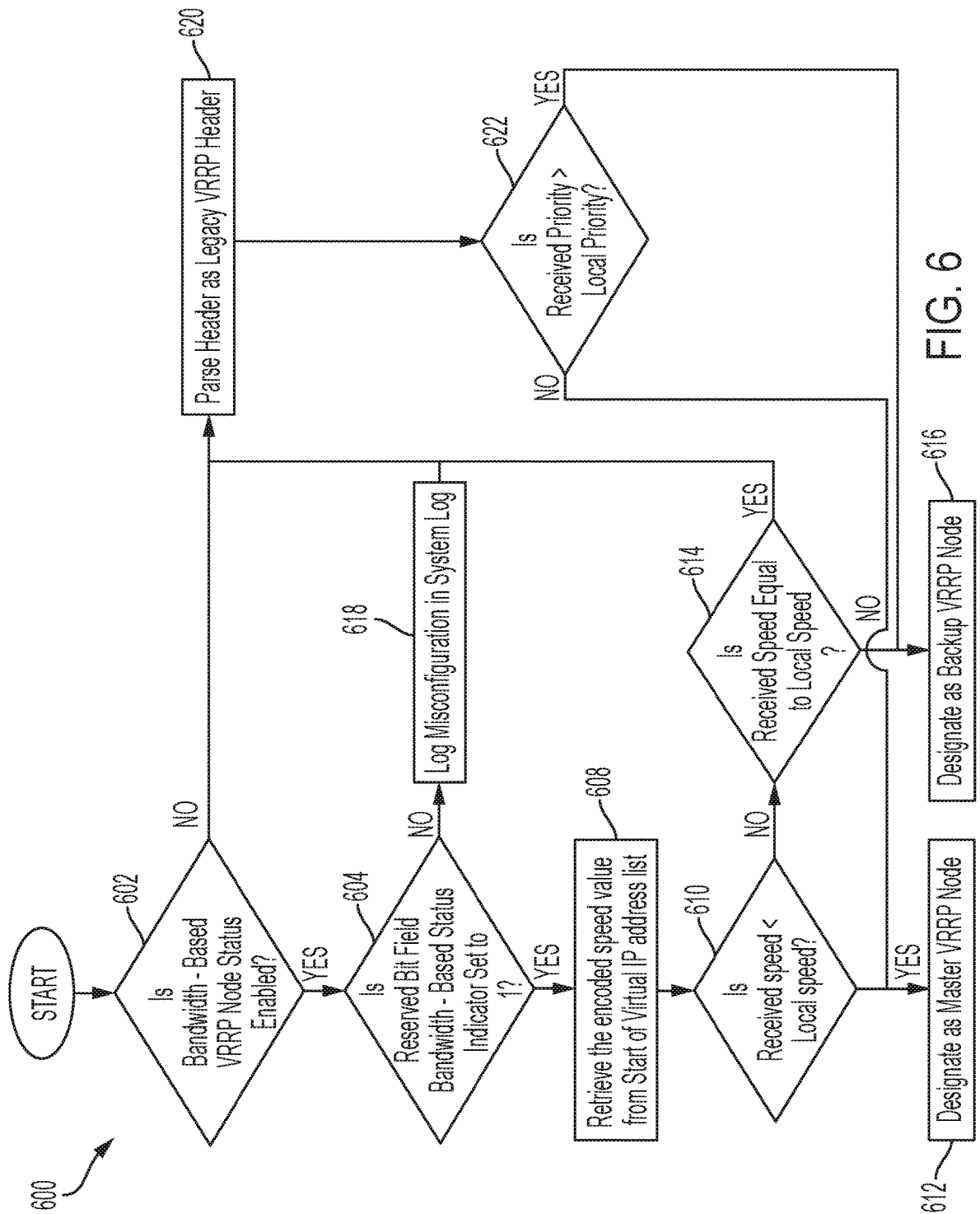
FIG. 6 is a flow chart of an example method for processing a received VRRP header according to some embodiments of the disclosure.

An information handling system may receive a VRRP header from a peer information handling system containing a bandwidth of a connection between the peer information handling system and a client information handling system and may extract the bandwidth from the VRRP header. An example method 600 of processing a received VRRP header is shown in FIG. 6. At step 602, a determination may be made of whether bandwidth-based VRRP node status determination is enabled. For example, a second information handling system that has received a VRRP header from a first, peer, information handling system may determine whether the second information handling system is configured for bandwidth-based VRRP node status designation. For example, a user may configure the system to enable bandwidth-based VRRP node status designation using a command line interface (CLI). The command line interface may also allow a user to manually configure a VRRP advertisement interval, a VRRP preemption mode, a node priority, a tracking interface, and a virtual IP address of a router. The VRRP header may, for example be a VRRP header transmitted from a first information handling system, as described with respect to the method 500 of FIG. 5.

If the second information handling system is not configured for bandwidth-based VRRP node status determination, the second information handling system may, at step 620, parse the header as a legacy VRRP header. For example, the second information handling system may extract a VRRP priority value from the VRRP header. Thus, if the second information handling system is not configured for bandwidth-based VRRP node status determination, a bandwidth encoded in the VRRP header may be ignored, and a priority included in the VRRP header may be used for VRRP node status determination instead. In some embodiments, the header may be parsed as a legacy VRRP header for implementing load balancing and sharing techniques between the first information handling system and the second information handling system, such as in a VRRP active-active configuration. At step 622, the second information handling system may determine whether a priority value extracted from the received VRRP header is greater than a local priority value of the second information handling system. For example, the second information handling system may compare a locally stored priority value for the second information handling system with the priority value extracted from the received VRRP header. If the received priority value is greater than the local priority value, the second information handling system may, at step 616, be designated as a VRRP backup node. If the received priority value is less than the local priority value, the second information handling system may, at step 612, be designated as a master VRRP node. If the received priority values are equal, the second information handling system may compare IP addresses of the first and second information handling systems, and the information handling system with the higher IP address may be designated as the VRRP master node.

If bandwidth-based VRRP node status determination is determined to be enabled at step 602, a determination may be made, at step 604, of whether a reserved bit field for a bandwidth-based status indicator of the received VRRP header is set to one. If the reserved bit field is not set to one, the second information handling system may, at step 618, log a misconfiguration in a system log, and may proceed to step 620, to parse the VRRP header as a legacy VRRP header. If the reserved bit field is determined to be set to one at step 604, the second information handling system may, at step 608, retrieve the encoded speed value from the start of the virtual IP address list. For example, the second information handling system may extract an encoded bandwidth of a connection between a first information handling system and the client information handling system, from the VRRP header.

At step 610, the second information handling system may determine if the received speed is less than a local speed. For example, the second information handling system may compare the bandwidth extracted from the VRRP header with a bandwidth of a connection between the second information handling system and the client information handling system. If the received speed is less than the local speed, the second information handling system may, at step 612 designate itself as a VRRP master node.

If, at step 610, the received speed is determined to be greater than or equal to the local speed, the second information handling system may, at step 614, determine whether the received speed is equal to the local speed. If the received speed is not equal to the local speed, meaning the received speed is greater than the local speed, the second information handling system may, at step 616, designate itself as a VRRP backup node. If the received speed is equal to the local speed, the second information handling system may proceed to step 620 to parse the received VRRP header as a legacy VRRP header and to select a VRRP node status of the second information handling system based on a comparison of a priority value encoded in the VRRP header and a local priority value. Thus, a second information handling system may receive a VRRP header and may extract information from the received VRRP header to determine a VRRP node status of the second information handling system.

The schematic flow chart diagrams and process flow diagram of FIGS. 3-6 are generally set forth as logical flow diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for selecting a virtual router redundancy protocol (VRRP) master node, the method comprising:
    receiving, by a first information handling system, a VRRP header from a second information handling system, wherein the VRRP header includes an indicator that the VRRP master node will be selected based on a first bandwidth of a first connection between the first information handling system and a client information handling system and a second bandwidth of a second connection between the second information handling system and the client information handling system, and wherein the VRRP header further includes an indication of the second bandwidth of the second connection;
    determining, by the first information handling system the first bandwidth of the first connection between the first information handling system and the client information handling system;
    determining, by the first information handling system, that the first bandwidth is greater than the second bandwidth;
    designating, by the first information handling system, the first information handling system as a VRRP master node based, at least in part, on the determination that the first bandwidth is greater than the second bandwidth, while the second information handling system is configured with a higher priority value than the first information handling system; and
    controlling, by the first information handling system VRRP operation of the first information handling system based, at least in part, on the designation of the first information handling system as the VRRP master node.

2. The method of claim 1, further comprising controlling, by the first information handling system, VRRP operation of the second information handling system based, at least in part, on the designation of the first information handling system as the VRRP master node.

3. The method of claim 1, wherein the first and second information handling systems are peer VRRP nodes.

4. The method of claim 1, wherein controlling VRRP operation of the first information handling system comprises routing traffic from the client information handling system through the first information handling system based, at least in part, on the designation of the first information handling system as the VRRP master node.

5. The method of claim 1, further comprising detecting a drop in the bandwidth of the second connection and wherein designating the first information handling system as the VRRP master node comprises changing a designation of the first information handling system from backup to master.

6. The method of claim 1, wherein determining the first bandwidth of the first connection comprises measuring a bandwidth of the first connection.

7. The method of claim 1, further comprising transmitting a VRRP header containing a bandwidth of the first connection from the first information handling system to the second information handling system.

8. The method of claim 1, wherein the indication of the second bandwidth is encoded in a virtual IP address list of the VRRP header, further comprising:
   extracting, by the first information handling system, the indication of the second bandwidth from the virtual IP address list of the VRRP header.

9. A first information handling system comprising:
   a processor,
   wherein the processor is configured to perform steps comprising
      receiving a VRRP header from a second information handling system, wherein the VRRP header includes an indicator that the VRRP master node will be selected based on a first bandwidth of a first connection between the first information handling system and a client information handling system and a second bandwidth of a second connection between the second information handling system and the client information handling system, and wherein the VRRP header further includes an indication of the second bandwidth of the second connection;
      determining the first bandwidth of the first connection between the first information handling system and the client information handling system;
      determining that the first bandwidth is greater than the second bandwidth;
      designating the first information handling system as a VRRP master node based, at least in part, on the determination that the first bandwidth is greater than the second bandwidth, while the second information handling system is configured with a higher priority value than the first information handling system; and
      controlling VRRP operation of the first information handling system based, at least in part, on the designation of the first information handling system as the VRRP master node.

10. The information handling system of claim 9, wherein the first and second information handling systems are peer VRRP nodes.

11. The information handling system of claim 9, wherein the processor is further configured to perform steps comprising controlling VRRP operation of the second information handling system based, at least in part, on the designation of the first information handling system as the VRRP master node.

12. The information handling system of claim 9, wherein controlling VRRP operation of the first information handling system comprises routing traffic from the client information handling system through the first information handling system based, at least in part, on the designation of the first information handling system as the VRRP master node.

13. The information handling system of claim 9, wherein determining the first bandwidth of the first connection comprises measuring a bandwidth of the first connection.

14. The information handling system of claim 9, wherein the processor is further configured to perform steps comprising transmitting a VRRP header containing a bandwidth of the first connection from the first information handling system to the second information handling system.

15. The information handling system of claim 9, wherein the indication of the second bandwidth is encoded in a virtual IP address list of the VRRP header, and wherein the processor is further configured to perform steps comprising:
   extracting, by the first information handling system, the indication of the second bandwidth from the virtual IP address list of the VRRP header.

16. A computer program product, comprising:
   a non-transitory computer readable medium comprising instructions to perform steps comprising:
      receiving, by a first information handling system, a VRRP header from a second information handling system, wherein the VRRP header includes an indicator that the VRRP master node will be selected based on a first bandwidth of a first connection between the first information handling system and a client information handling system and a second bandwidth of a second connection between the second information handling system and the client information handling system, and wherein the VRRP header further includes an indication of the second bandwidth of the second connection;
      determining, by the first information handling system, the first bandwidth of the first connection between the first information handling system and the client information handling system;
      determining, by the first information handling system, that the first bandwidth is greater than the second bandwidth;
      designating, by the first information handling system, the first information handling system as a VRRP master node based, at least in part, on the determination that the first bandwidth is greater than the second bandwidth, while the second information handling system is configured with a higher priority value than the first information handling system; and
      controlling, by the first information handling system, VRRP operation of the first information handling system based, at least in part, on the designation of the first information handling system as the VRRP master node.

17. The computer program product of claim 16, wherein controlling VRRP operation of the first information handling system comprises routing traffic from the client information handling system through the first information handling system based, at least in part, on the designation of the first information handling system as the VRRP master node.

18. The computer program product of claim 16, wherein the non-transitory computer readable medium further comprises instructions to perform steps comprising detecting a drop in the bandwidth of the second connection and wherein designating the first information handling system as the VRRP master node comprises changing a designation of the first information handling system from backup to master.

19. The computer program product of claim 16, wherein determining the first bandwidth of the first connection comprises measuring a bandwidth of the first connection.

20. The computer program product of claim 16, wherein the non-transitory computer readable medium further comprises instructions to perform steps comprising transmitting a VRRP header containing a bandwidth of the first connection from the first information handling system to the second information handling system.

* * * * *